March 6, 1973   R. C. WEISCHEDEL   3,719,424
RADIANT ENERGY SENSOR
Filed Dec. 28, 1970
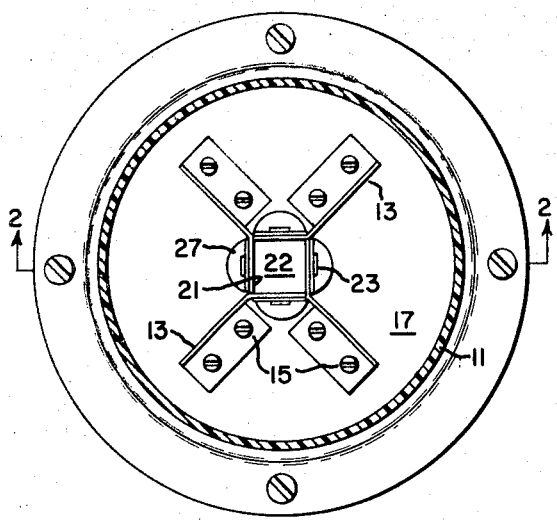
FIG.1
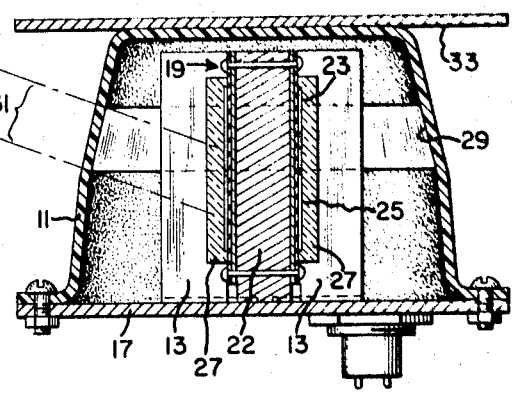
FIG.2
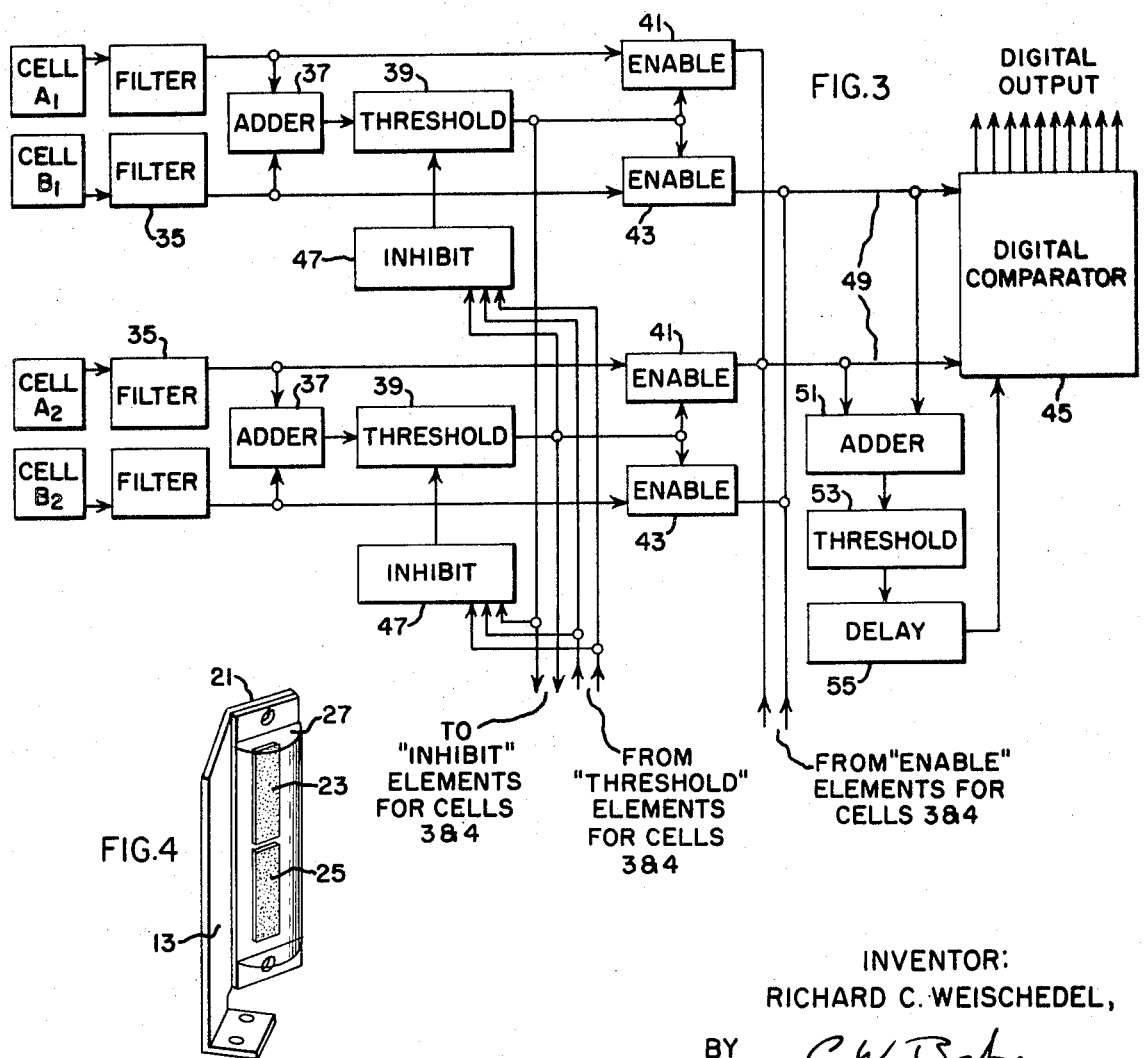
INVENTOR:
RICHARD C. WEISCHEDEL,
BY C W Baker
HIS ATTORNEY.

3,719,424
RADIANT ENERGY SENSOR
Richard C. Weischedel, Camillus, N.Y., assignor to
General Electric Company
Filed Dec. 28, 1970, Ser. No. 101,865
Int. Cl. G01b *11/26*
U.S. Cl. 356—141                                7 Claims

ABSTRACT OF THE DISCLOSURE

A radiant energy sensor for determining light source location, more particularly for determining the angle of elevation of a nuclear burst by measuring the angular inclination of the line of sight to the center of light output resulting from the burst. This is accomplished by provision of a pair of radiant energy sensor elements mounted in vertical arrayed relationship behind an aperture aligned with the upper of the two sensor elements, so that with different angles of elevation of the light source there occurs a differential change in the illuminated areas of the two sensor elements and a corresponding change in the ratio of their respective signal outputs, which may be measured to yield an indication of elevation angle. For coverage of the entire azimuth a plurality of such sensor pairs may be provided in circular array, with signal processing means being provided for selection or combination of those of the sensor outputs which are to be made determinative in the elevation angle measurement.

BACKGROUND OF THE INVENTION

This invention relates generally to a radiant energy sensor for determining light source location, and more specifically to such a sensor particularly useful for determining the angle of elevation of a nuclear burst above the horizon. The invention is in no way limited in utility to this particular use, however, and it offers advantage in many other applications in which a precise yet convenient and relatively inexpensive mechanism is desired for determining the location of a light source.

For the purpose of evaluating the possible consequences of a nuclear explosion from some remote point on the ground at which it may be desired to predict the probable time and quantity of fall-out, for example, it is necessary to know at least approximately the altitude at which the burst occurred. Such height determination can be accomplished by obtaining a measure of the elevation angle to the burst from this remote ground point; the elevation angle measurement then can be combined with a distance measurement accomplished by other equipment to yield the height of burst.

Various methods have been used in the past for obtaining elevation angle measurements, the simplest and most obvious being of course visual observation and estimation of the relative height. Photosensor systems of various kinds also have been used, sometimes with photoconductive cells but more commonly with photovoltaic. The output of such cells varies not only with intensity of the incident illumination but also with its angle of incidence on the photosensitive surface, so by placing the photosensitive surfaces of two such cells perpendicular to each other, with one horizontal and one vertical, the incident angle of the light striking the two cells can be determined by comparison of their respective outputs. Unfortunately, however, the output of photocells in this configuration varies not only with the elevation angle but also with azimuth angle, and the photocell output is not well defined at large azimuth angles particularly in high ambient light environments. A further problem arises from reflected light which, even though arising from the nuclear event being observed, arrives at the sensor after reflection from some surface removed from the burst site and thus indicates a different elevation angle.

The present invention has as its principal objective the provision of radiant energy sensors not subject to these and other shortcomings of known sensors, and capable of providing accurate measurement of radiant energy source location even over wide fields of view and under adverse conditions such as the presence of high ambient illumination levels. It is also an object of the invention to provide an array of such sensors capable of providing elevation angle measurement for a radiant energy source located at any azimuth angle over the full 360° horizon, and signal processing mean for deriving the angle measurement from the several sensor signal outputs of such array. A further object is the provision of radiant energy sensors characterized by relative simplicity of structure and of associated circuitry, as well as by good reliability of operation and economy of manufacture.

SUMMARY OF THE INVENTION

In its preferred embodiment shown and described herein, the radiant energy sensor of this invention comprises paired sensor elements which, for elevation angle measurement, are mounted in a vertical plane one directly above the other. The cells are shielded against all light except that entering through an aperture disposed in spaced opposed relationship to the upper of the two sensor elements and having a vertical dimension of the order of that of the sensor element. Then radiant energy from a source located on the horizontal will illuminate the upper sensor element while radiant energy from sources above the horizontal will differentially illuminate both of the sensor elements with their illuminated area ratios varying with the magnitude of the elevation angle, so that by comparison of the electrical signal outputs of the two sensor elements there may be derived a measure of elevation angle of the light source. To cover the entire horizon, a plurality of such sensor pairs are provided in circular array with each such sensor pair covering one circular sector, and to obtain more uniform coverage over this sector each such photosensor pair is provided with a light gathering lens system comprising a cylindrical lens having its local plane at the photosensitive surface so as to yield a substantially constant output with changing azimuth angle. The signal outputs of the several photosensor pairs are processed by electrical circuit means operative to select the controlling output signal preferably by thresholding or "greatest of" signal selection processes.

BRIEF DESCRIPTION OF THE DRAWING

The foregoing and other objects, features and advantages of the present invention will be further understood and more fully appreciated by reference to the appended claims and the following detailed description when read in conjunction with the accompanying drawings, wherein:

FIG. 1 is a part sectional view of a radiant energy sensor for elevation angle measurement in accordance with the invention;

FIG. 2 is a sectional view taken along the line 2—2 in FIG. 1;

FIG. 3 is a block diagram of signal selection circuitry usable with the photosensor array of FIG. 1; and FIG. 4 is a detailed view of one of the photocell and lens assemblies in the sensor of FIG. 1.

DESCRIPTION OF THE PREFERRED EMBODIMENTS

With continuing reference to the drawings, the photosensor of this invention as best shown in FIGS. 1 and 2 comprises housing wall means 11 defining a circular chamber interiorly divided into quadrants by four radially extending dividers or partitions 13 each secured as at 15 to the housing base member 17. Within each of the quadrants thus defined, and mounted to a central vertically disposed support assembly 19 which may conveniently be formed by four interfitting strips 21 each fabricated integrally with one of the partitions 13 and attached to a center post 22 as shown, there is provided a pair of photosensor elements 23 and 25. These elements are carried on insulation boards 27 which may be fiberglass or like insulating material and which are affixed to the support strip 21 by suitable fastening means as illustrated.

As best shown by FIG. 4, the photosensor mounting arrangement is such that the photosensitive surfaces of each photosensor pair are disposed in a common vertical plane with one positioned directly above the other and spaced apart only sufficiently to enable electrical isolation of the two elements. Each such element pair is orthogonally related to the pair on either side thereof as best seen in FIG. 1, so that the four photosensor pairs together constitute a circular array in which each pair has a field of view of 90° or one quarter of the 360° horizon.

To provide more uniform response over the full 90° arc through which each photosensor pair operates, a cylindrical lens element 27 is mounted generally as shown with its longitudinal axis vertical and with the two photosensor active surfaces disposed in its focal plane. These cylindrical lenses over the photocells function to provide a nearly constant intensity of illumination on the cells with change in azimuth angle, so as to provide essentially constant cell output irrespective of the location in azimuth of the radiant energy source. In practice this basic cylindrical lens and photocell arrangement can be made to provide nearly constant sensitivity over an arc substantially wider than 90° and even up to 180°, so that it is also possible to implement the photosensor of this invention with as few as two lenses plus photosensor pair combinations and still obtain acceptable coverage of the entire 360° horizon, but the four-pair or quadrant arrangement shown provides more uniform coverage and accordingly is preferred.

The cylindrical lens elements 27 may conveniently be fabricated of a transparent plastic such as one of clear epoxies, which is molded directly in place over and adherent to the photosensor mounting boards 21. This readily enables any desired lens configuration and at the same time provides protective encapsulation of the photosensor elements 23 and 25.

These elements may be of any suitable conventional photosensitive material characterized by responsiveness to incident radiation to provide an electrical signal output of magnitude proportioned to the area of such surface illuminated by the radiation. Various photoconductive materials such as cadmium sulfide and the like may be used, though in the interests of reducing power supply requirements photovoltaic silicon cells operating in the leakage (linear) mode are preferred. The photosensitive surfaces are made of sufficient width that with their associated cylindrical lenses 27 they provide essentially constant signal output for incident light of given intensity from a source at any point within the 90° arc to be covered by each sensor assembly, and of length sufficient to yield an output signal of acceptable amplitude with incident light intensities in the approximate range anticipated.

The sensor housing 11 may conveniently be fabricated of a transparent plastic molded to the general shape illustrated and interiorly coated with an opaque material over those surfaces shown dotted in FIG. 2. An annular band as at 29 is left uncoated to form a circular window or aperture through which light is admitted into the housing. This aperture in its vertical dimension is approximately equal to the vertical height of the upper photosensor element 15 or somewhat smaller in height as shown, and the lower edge of the aperture is aligned in opposed relationship with the lower edge of that photosensor element.

With this arrangement, light emanating from a point at ground or horizon level will be constrained by the aperture 29 to be incident only upon the upper of the photosensor elements, the elements 23, and the lower elements 25 will remain dark. When the radiant energy source is located at some intermediate elevation angle, as for example when the light rays emanating therefrom parallel the lines 31, the extent of illumination of the upper cell 23 will be reduced and lower cell 25 now will also be partially illuminated. Such differential change in illumination of the upper and lower cells provides a measure of the angle of elevation of the radiant energy source, by comparison of the electrical signal outputs of the two cells.

The lower edge of aperture 29 need not be in precise horizontal alignment with the line dividing photocells 23 and 25, but may be some small distance below that line so that the lower cell also will receive some illumination from a light source at horizon level, though only to relatively small extent such as 5 to 10 percent. Such exposure of the lower cells to illumination by horizon level sources assures signal output therefrom even at zero elevation angles, thus avoiding any possible problem in processing zero signal to noise ratios. This introduces an offset into the elevation angle measurement, of course, but it may readily be compensated for by calibration.

As will be apparent from FIG. 2, when the line of sight to a light source is above a certain elevation angle the illumination of upper sensor elements 23 through aperture 29 will become fully cut off. At elevation angles greater than this the ratio or proportionality of the sensor element outputs will no longer provide an accurate measure of elevation angle, but of course in the nuclear event detection application the equipment would not be expected to survive a nuclear event this close to overhead so the capability to measure such high angles is not needed. To minimize entry of light into the housing from such high angle sources a circular shield 33 fixed to the top of housing 11 limits the field of view to the elevation angle range of interest.

In applications in which only a single photosensor pair and associated optical system need be provided because elevation angle measurement through something less than the full 360° horizon is desired, the output signal ratioing or comparator circuit could be any of many conventional electrical circuits capable of ratioing the amplitudes or two input signals. Where a plurality of photosensor pairs are to be provided as in the present embodiment, such simple ratioing circuit may still be used if desired, with the upper elements of all photosensor pairs being connected in ganged relation so as to combine their respective outputs and with the lower elements being similarly connected. Then if the light source lies within the field of view of two photosensor pairs the output signals of the upper and lower elements will additively combine, and the ratio of these combined signals will provide the desired measure of elevation angle.

Usually, however, better accuracy of measurement and reduced sensitivity to reflected light can be achieved by use of a thresholding or "greatest of" circuit operative to block the transmission of all of the photosensor outputs to the comparator except those outputs from the photosensor pair in the particular quadrant in which the event has occurred, to thus avoid degradation of the measurement by reflected light or other interfering light incident upon the other photosensor pairs. To accomplish this there is provided the selection and comparator circuitry shown in block diagram form in FIG. 3, in which two of the photosensor elements are shown as cells A1 and B1 constituting one photosensor pair, cells A2 and B2 constituting a second such pair. The third and fourth such cell pairs have in the interest of simplification been omitted from FIG. 3 but their mode of connection into the circuitry is shown.

The thermal signal of a nuclear bomb is characterized by a fast rise short pulse of energy followed by a longer second thermal. The first thermal, which is the source of radiant energy from which the elevation angle measurement preferably is derived, occurs in milliseconds while the second of the two thermals can be of several seconds duration. To limit system response to the first or fast-rise pulse, high-pass filter elements 35 are introduced into each signal processing channel to pass only the higher frequency signals and to block lower frequency signals such as arise from the second thermal or from changes in ambient illumination, sunlight and the like. For selection of the pair of cells the output from which is to be controlling, thresholding means comprising adders 37 are connected in each channel to additively combine the signal outputs of that photosensor pair and to pass such combined signal to a threshold detector 39. The photosensor pair which most directly faces the light source will of course have the greatest output and accordingly the combined signal output of this pair will be first to reach the threshold level set by threshold 39. The first such threshold to fire outputs a signal which acts first to open two "enable" gates 41 and 43 through which the photosensor output signal in that channel then pass to a comparator 45 which preferably is of digital type as indicated.

The signal output from the first to fire of the thresholds 39 also operates through connections as shown to energize an "inhibit" element 47 in each of the other three channels, thus assuring that the "enable" gates in those channels remain closed and block any transmission of signal output from their associated photosensor elements into the comparator 45. In this way only the pair of photosensors most directly facing the nuclear event can output their signals into the comparator, and errors due to reflected light signals generated by the other photosensors are avoided. Alternatively, where the quadrant location of the burst is known from some external source such as an electromagnetic wave direction finder which is operated in association with the elevation angle sensor, the quadrant signal supplied by such external source may be applied directly to the "enable" gates 41–43 so as to pass signals only from the photosensors of that quadrant to the comparator 45.

If the comparator 45 is of digital character as shown, means preferably are provided for delaying its response to any signal input until some threshold level is reached, and toward this end the signals on its two input lines 49 are combined in an adder 51. When their combined amplitudes reach a predetermined level the resultant input into a threshold 53 causes that circuit to output a signal which is coupled through a delay element 55 to enable the comparator, which then measures the ratio of the two signals on its input leads 49 and outputs a digital representation of the elevation angle. The delay element 55 need introduce a delay of only a few milliseconds and its purpose is to assure that the comparator 45 is not enabled until approximately the peak of the first thermal.

The dividers or partitions 13 which as shown in FIGS. 1 and 2 divide the 360° horizon into quadrants are helpful in reducing noise due to stray illumination, but are not essential and may be omitted if preferred. Many other changes and modifications will occur to those skilled in the art and it therefore should be understood that the appended claims are intended to cover all such modifications as fall within the true spirit and scope of the invention.

What is claimed as new and desired to be secured by Letters Patent of the United States is:

1. A radiant energy sensor for determining the location of a radiant energy source by measurement of the angle subtended between a reference line and the line of sight from a measurement point on the reference line to said radiant energy source, comprising:
    (a) first and second sensor elements each having a light-sensitive surface responsive to radiation incident thereon to provide an electrical signal output of magnitude related to the illuminated area of such surface;
    (b) means mounting said first and second sensor elements in adjacent relation with their respective light-sensitive surfaces extending along said reference line with said first sensor element approximately centered on said measurement point;
    (c) wall means defining an aperture disposed in spaced opposed relationship to said first sensor element and having its dimension along said reference line of the order of that of said first sensor element, whereby radiant energy from a source located on a perpendicular to said reference line through said measurement point is transmitted through said aperture to illuminate said first sensor element, and whereby radiant energy from a source to which the line of sight defines an angle to said perpendicular is constrained by said aperture to illuminate said first and second sensor elements differentially with their illuminated area ratios varying with the magnitude of said angle; and
    (d) comparator means for comparing the electrical signal outputs of said first and second sensor elements to thereby derive a measure of angular position of said radiant energy source with respect to said reference line.

2. A radiant energy sensor as defined in claim 1 wherein said reference line is a vertical line perpendicular to the horizon, whereby the sensor element output signal comparison provides a measure of the angle of elevation of the radiant energy source above the horizon.

3. A radiant energy sensor as defined in claim 1 further including cylindrical lens means disposed parallel to said reference line and interposed between said aperture and said sensor elements for gathering light over a relatively wide angle and focusing it on said sensor elements.

4. A radiant energy sensor as defined in claim 1 comprising a plurality of pairs of said first and second sensor elements disposed in a radially outwardly facing circular array centered on said reference line.

5. A radiant energy sensor as defined in claim 4 further including signal selection means responsive to sensor element output signal amplitudes to pass the output signals from only one of said sensor element pairs to said comparator means.

6. A radiant energy source as defined in claim 1, wherein said photosensor elements and said aperture are so positioned with respect to each other along said reference line that radiant energy from a source located on a perpendicular to that line will partially illuminate said second photosensor element as well as the first, to provide higher signal to noise ratio for said second photosensor from sources on said perpendicular.

7. A radiant energy sensor for determining the angle of elevation of a radiant energy source with respect to the horizon, comprising:
    (a) a pair of photocells each mounted in a vertical plane one directly above the other;
    (b) housing means shielding said photocells against light and defining an aperture disposed in spaced opposed relationship to the upper of the two photocells of said pair and having a vertical dimension of the order of that of said upper photocell, whereby radiant energy from a source close to or on the horizon is transmitted through said aperture to illuminate said upper photocell, and whereby radiant energy from a source located at a substantial angle to the horizon is constrained by said aperture to illuminate the photocells of said pair differentially with their illuminated area ratios varying with the angle of elevation of the source; and (c) comparator means for comparing the electrical signal outputs of said first and second sensor elements to thereby derive a measure of angular position of said radiant energy source with respect to the horizon.

References Cited

UNITED STATES PATENTS

| 3,548,207 | 12/1970 | Sinclair | 250—83.6 R |
| 3,137,794 | 6/1964 | Seward | 250—216 |
| 3,395,605 | 8/1968 | Odone | 250—204 |

BENJAMIN A. BORCHELT, Primary Examiner

S. BUCZINSKI, Assistant Examiner

U.S. Cl. X.R.

250—209